United States Patent [19]

Hopper

[11] 4,147,156
[45] Apr. 3, 1979

[54] SOLAR ENERGY COLLECTOR HAVING A CONVECTION CURRENT INHIBITING MEMBER

[75] Inventor: Thomas P. Hopper, Durham, Conn.

[73] Assignee: Sunworks, Inc., Guilford, Conn.

[21] Appl. No.: 780,441

[22] Filed: Mar. 23, 1977

[51] Int. Cl.² .................................................. F24J 3/02
[52] U.S. Cl. ..................................... 126/271; 126/270
[58] Field of Search ................ 126/270, 271; 237/1 A

[56] References Cited

U.S. PATENT DOCUMENTS

| 1,801,710 | 4/1931 | Abbot | 126/271 |
|---|---|---|---|
| 3,076,450 | 2/1963 | Gough et al. | 126/271 |
| 3,859,980 | 1/1975 | Crawford | 126/271 |
| 3,953,110 | 4/1976 | Charoudi | 237/1 |

Primary Examiner—Kenneth W. Sprague
Attorney, Agent, or Firm—DeLio and Montgomery

[57] ABSTRACT

A solar energy collector housing having a transparent cover, and a solar energy absorbing panel in the housing beneath the cover, and including a transparent member having closed tubular air pockets positioned between the panel and the cover to inhibit convection currents therebetween.

6 Claims, 10 Drawing Figures

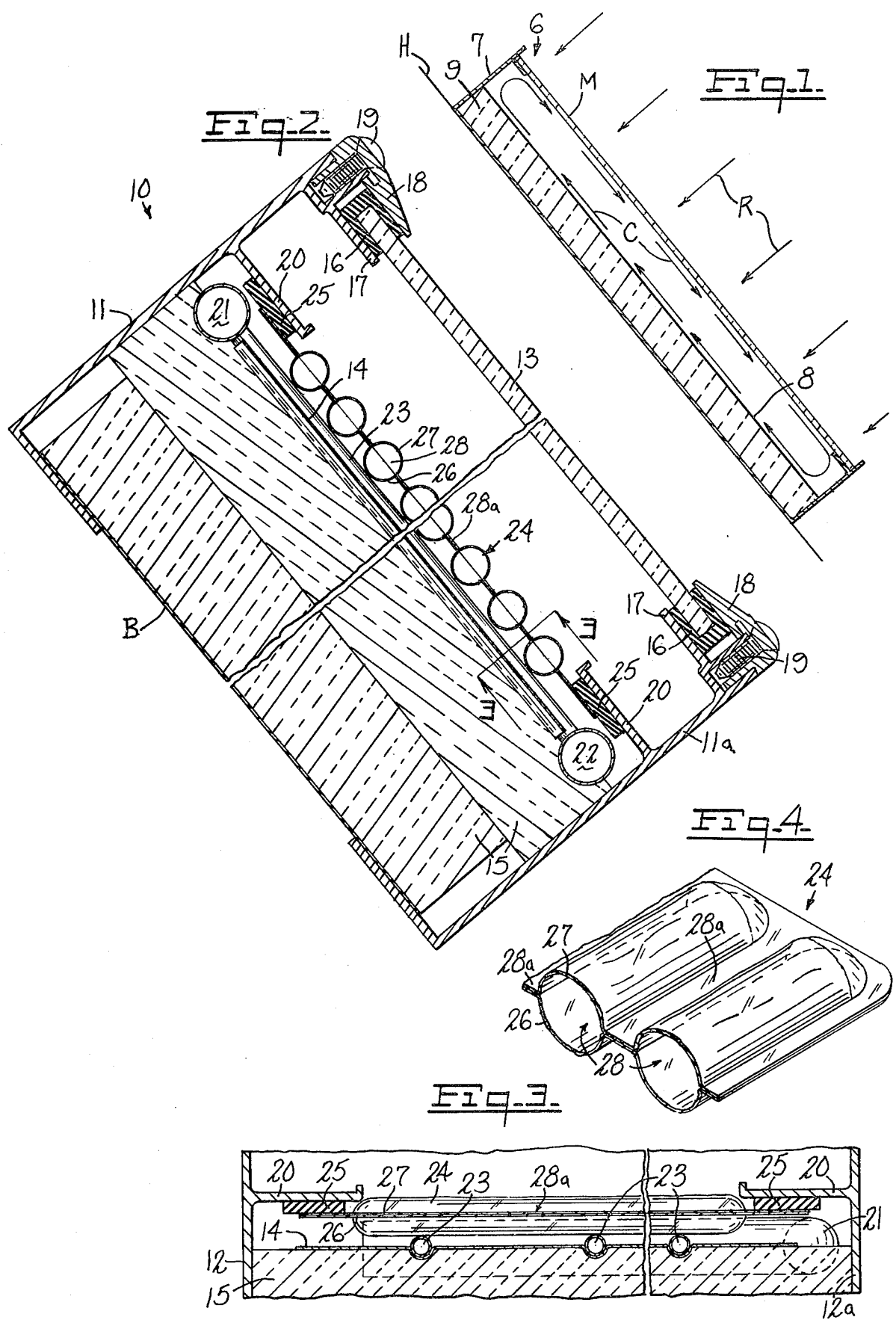

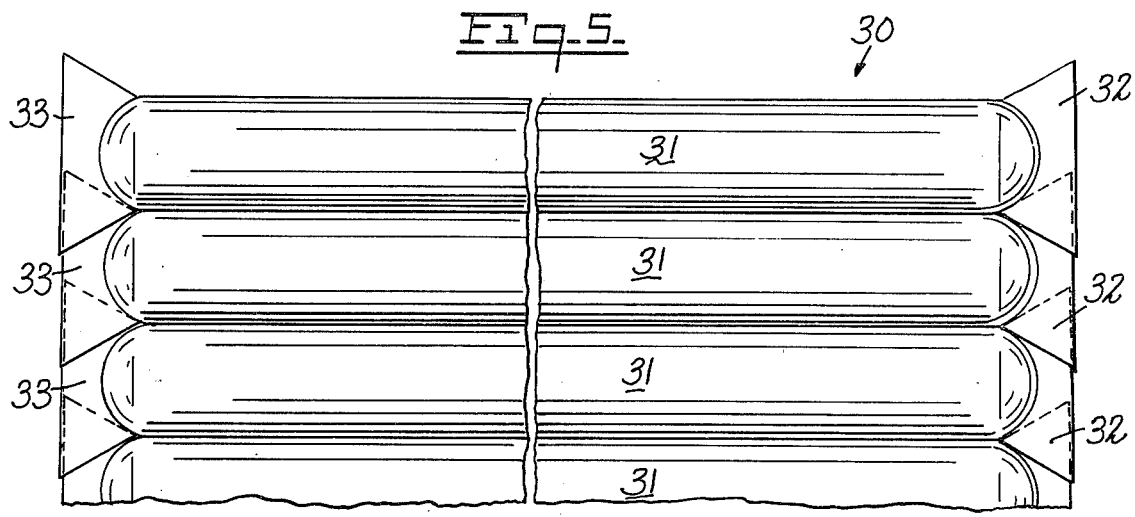
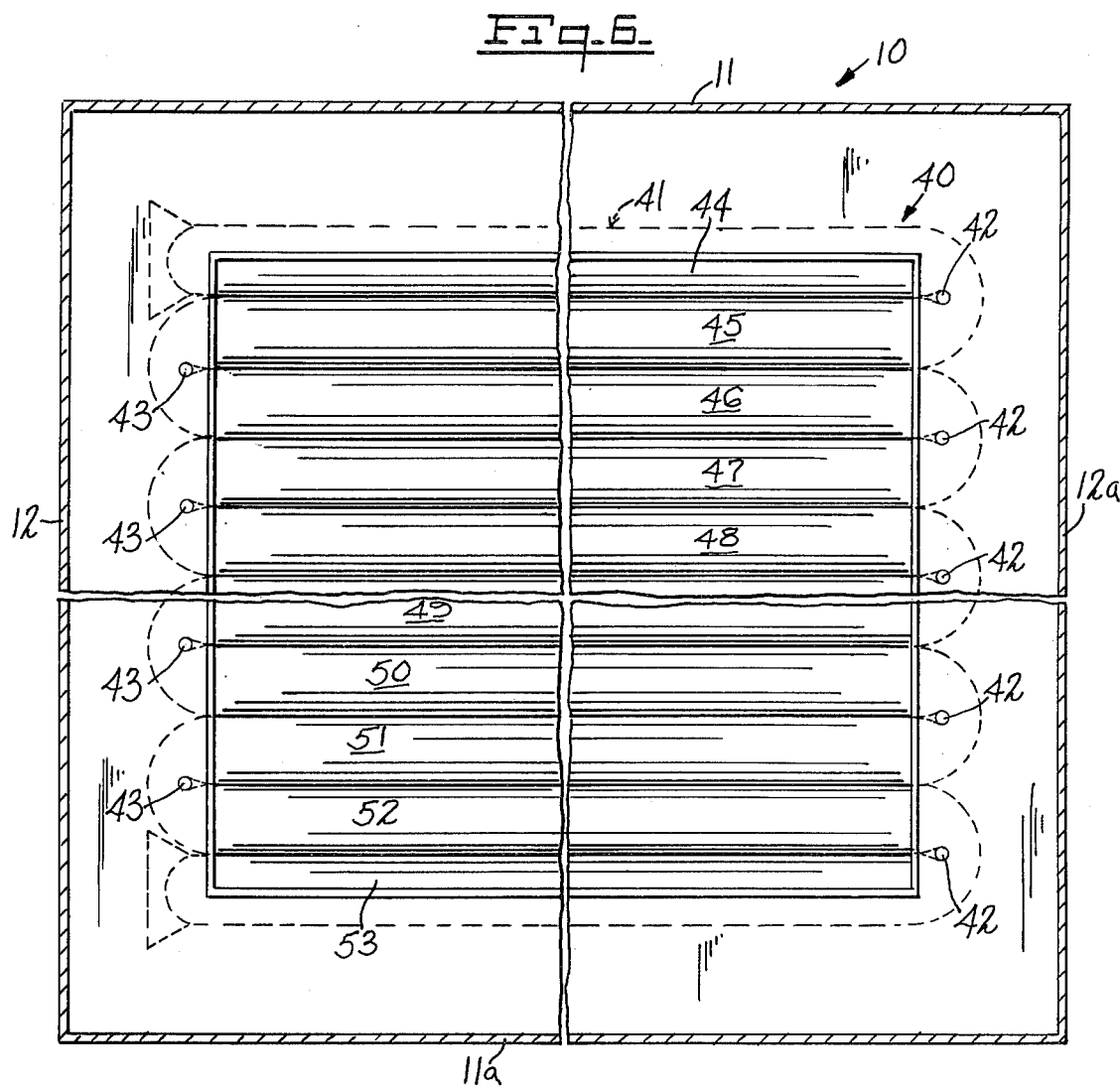

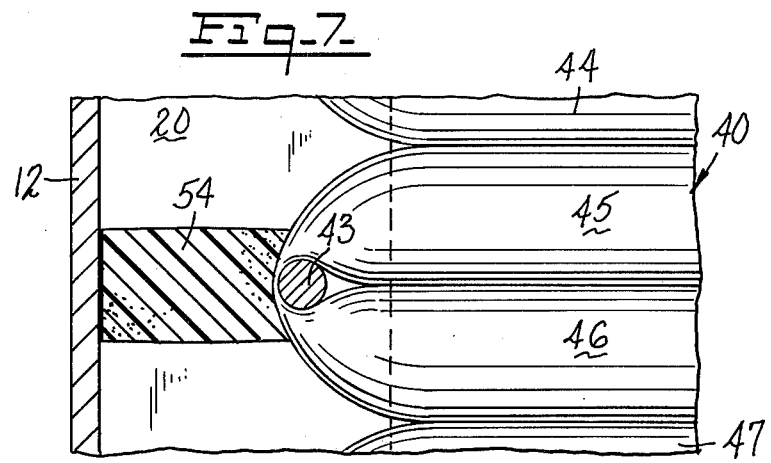
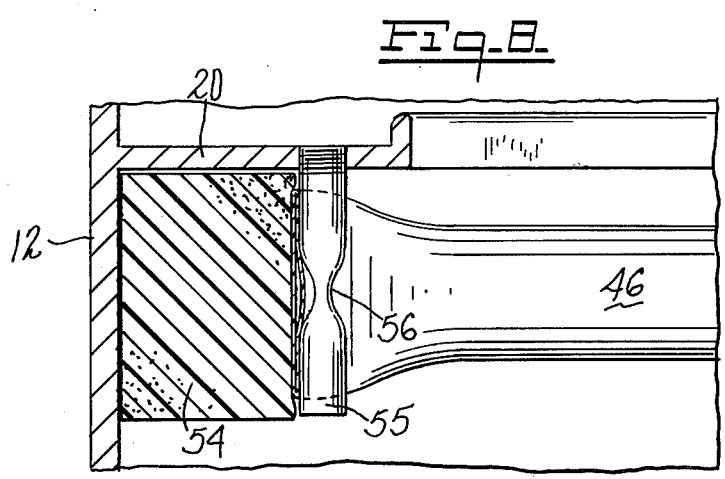
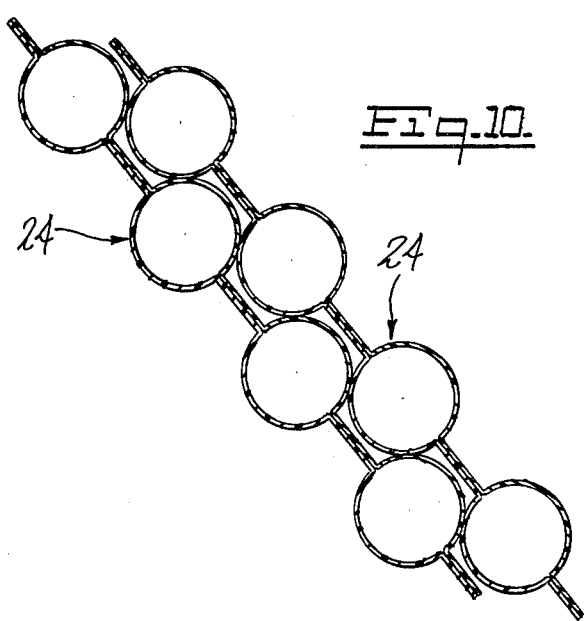
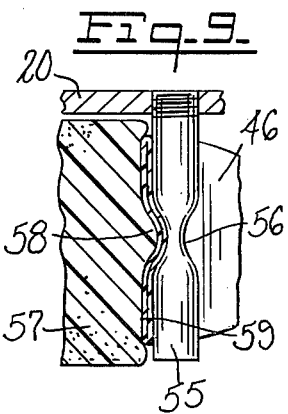

SOLAR ENERGY COLLECTOR HAVING A CONVECTION CURRENT INHIBITING MEMBER

This invention relates to solar energy collectors and more particularly relates to apparatus for reducing thermal energy losses in such collectors due to convective air flow therein.

The use of solar energy is becoming more and more accepted as a viable alternative or supplement to conventional fossil fuel fired energy sources. It is currently used primarily to provide heat for a structure or to provide hot water; however, more uses may be found in the near future for the solar energy collector. The cost of the initial installation of a solar energy collecting system at the present time is substantially higher than the cost of a conventional heating system. To make solar heating systems more competitive with conventional systems, energy losses which occur in the system and particularly in the collector thereof must be minimized to increase the operating efficiency thereof, thereby minimizing the absorber area required to collect a predetermined quantity of solar energy.

Most solar energy heating systems utilize a collector module having a solar energy absorbing panel and a heat transfer medium such as a fluid, which is moved in heat transfer relation with respect to the absorber. The transfer medium may either be utilized for heating directly or it may pass through a heat exchanger after which the transferred energy is then used for heating or other purposes.

Most collectors comprise a housing including a transparent cover member spaced above and parallel to an absorber. The absorber is generally a panel or sheet situated within the collector housing intermediate the cover and the back. The collector housing is usually installed on a sloping roof or otherwise facing at an angle to the vertical, dependent on the latitude of the collector's installation on the earth. This serves to present the maximum absorber surface area orthogonal to the sun's rays.

The absorber panel is ordinarily at a much higher temperature than the transparent cover. This causes convection currents to form in the space therebetween. Because the absorber panel is at the higher temperature and because of the angular disposition thereof, the air adjacent the panel is heated and tends to rise, whereas the air adjacent the transparent cover, being cooler and more dense, tends to fall. A continuous convection current is thus established with the heated air moving up and around and into contact with the cooler transparent cover, to which it gives up its absorbed heat, while the cooler air flows across the absorber and takes heat therefrom. The continuous removal of thermal energy from the absorber by the convection currents serves to reduce the thermal efficiency of the collector, thereby requiring an increased area to yield a predetermined quantity of energy.

Accordingly, the present invention provides a new and improved collector structure which minimizes the loss of energy from the collector due to convection currents therein and does so at a minimum of expense and additional equipment.

Briefly stated, the invention in one form thereof comprises a collector of the type generally described with the provision of a transparent member defining horizontal air pockets disposed between the absorber and cover member to inhibit convection currents therebetween.

An object of this invention is to provide a solar energy collector having a greater thermal efficiency.

Another object of this invention is to provide a solar energy collector having new and improved means for inhibiting the flow of convection currents within the housing which would otherwise reduce thermal efficiency of the collector.

A further object of the invention is to provide a convection current inhibiting device for the purposes described which is light in weight and economical.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings:

FIG. 1 is a schematic drawing of a solar energy collector showing a representation of the convection currents formed in the chamber between the absorbing panel and the transparent cover;

FIG. 2 is a longitudinal sectional view of a collector embodying the invention;

FIG. 3 is an end section view taken along lines 3—3 of FIG. 2;

FIG. 4 is an isometric sectional view of a transparent convection inhibiting member shown in FIG. 2;

FIG. 5 is a plan view of another convection current inhibiting member embodying the invention;

FIG. 6 is a plan view of a collector with the cover removed showing another embodiment of the invention;

FIG. 7 is a partial plan view of a modification of the embodiment shown in FIG. 6, as seen from the bottom, with the base removed;

FIG. 8 is a detail from the side of a modification of the pin used in the embodiment of FIG. 7;

FIG. 9 is a detail of a modification of the resilient member shown in FIG. 8; and FIG. 10 is a sectional side view partially cut away of two convection current inhibiting members of FIG. 2 in nested overlapping relation.

FIG. 1 represents a collector 6 having a housing 7, with an absorber panel 8 therein above insulating material 9, and closed by a transparent cover member M, usually glass. The temperature at the absorber surface may be on the order of several hundred degrees Fahrenheit, while the temperature of the outer surface of the cover member is substantially ambient. The collector 6 is shown as being angularly disposed on a structure H to receive solar energy denoted by the arrows R.

The angular disposition of the collector and the substantial temperature gradient between the absorber and cover produces a large convection cell exemplified by the arrows C. This convection cell removes a substantial amount of heat from the absorber and may limit the thermal efficiency of the collector.

A new and improved solar energy collector 10 shown in FIGS. 2 and 3 comprises a housing having upper and lower end walls 11 and 11a, side walls 12 and 12a, a transparent cover member 13, and a solar energy absorber panel 14 disposed intermediate a bottom wall B and transparent cover member 13. The absorber 14 rests on a thick layer of insulation 15. Cover member 13 is preferably formed of a glass plate having its periphery embedded in a resilient sealing member 16. The sealing member 16 is clamped tightly between a support ledge 17 extending inwardly from the side walls 12 and 12a and a cap member 18 secured by screws 19. Collector 10 further includes condensation collecting trough members 20 extending inwardly from the housing walls spaced below supporting member 17. Any condensation collected within the housing is caught in the troughs 20 and runs down to the trough on lower end wall 11a to weep holes (not shown) in wall 11a.

Collector 10 is shown as being of the liquid heat exchange type and includes a heat exchange arrangement having an upper header 21, lower header 22 and a plurality of heat exchange tubes 23 disposed in intimate heat exchange relation with absorber 14, extending in substantially parallel spaced apart relation between headers 21 and 22. Absorber 14 may be formed having wells or troughs for intimately receiving the heat exchange tubes 23. A system utilizing this type of collector is shown in U.S. Pat. No. 3,980,071.

In accordance with the invention, a convection-inhibiting member 24 is provided to prevent the flow of convection currents in the chamber formed between absorber 14 and the transparent cover 13. Member 24 is preferably disposed across absorber 14 and held in contact with thermal tape 25 affixed to the underside of troughs 20. As shown in FIG. 4, member 24 is formed of two flexible sheets 26 and 27 of a transparent plastic, preferably polytetrafluoroethylene, overlaying each other and sealed together around the peripheral edges thereof, to form a plurality of elongated cylindrical air pockets 28. The elongated direction of the air pockets is placed horizontally, with respect to the inclined angle, across the absorber as shown in FIGS. 2 and 3.

Clear polytetrafluoroethylene, better known in one form by the trademark Teflon, is preferred because of its high heat resistance, up to 500° F., and its high degree of transmissivity. This material will not be adversely affected by the high temperatures of the surface of the absorber. The two sheets 26 and 27 are heat sealed in a dry atmosphere to prevent any later condensation in pockets 28. The cylindrical pockets 28 are preferably three-quarter to one inch in diameter and the spacing across the flats 28a between cylinders need only be enough to effect a seal between sheets 26 and 27. This may be on the order of one-eighth to one-quarter inch. The trapped gas spaces serve as dead air spaces and insulators, and the entire layer prevents circulation of convection currents to the much cooler cover member 13. The cylindrical pockets are preferably filled with air, but other gases may be included.

Any clear plastic sheet material may be utilized which is highly transmissive of solar energy and which will withstand the high temperatures within the collector. The member 24 need not be in contact with the absorber. It is positioned anywhere within the collector so as to have good edge contact integrity with the portions of the collector so that there will be no convection currents around the edges thereof. For example, the edges of member 24 could be in contact with the undersides of ledges 17. This arrangement would insulate the hotter air space above absorber 23 from the cooler cover member and maintain the temperature gradient across the height of the air space essentially constant.

Care should be taken during the formation of the air pockets 28 to allow sufficient slack so that when the air within them is heated while in the collector, the seals do not pull apart when the pockets expand from the heated air.

In operation, member 24 is positioned in the collector and the periphery thereof is in contact with the underside of troughs 20. The positioning of the layer will depend on the design of the collector housing. The tape 25 provides a thermal barrier both to loss of thermal energy, should the absorber contact the troughs, and to air which might otherwise flow around member 24. The collector is placed at the optimum angle to the vertical perpendicular to the solar rays R shown in FIG. 1, so as to receive the maximum solar energy on the absorber. The member 24 is positioned so that the air pockets 28 are disposed horizontally across absorber 14. The lower portion of the air pockets 28 serves to substantially impede any air flow along the absorber. Furthermore, because member 24 is substantially closer to panel 14 than is transparent cover 13, any temperature differential across the space therebetween is substantially less and any convection current that might form therebetween would be of substantially less power than would the convection current C formed in a conventional collector shown schematically in FIG. 1. Thus, member 24 provides an efficient insulator and since a transparent material is used, the convection cells are inhibited while allowing the sunlight to reach absorber 14.

Another form of the invention is shown in FIG. 5 where a convection inhibiting member 30 is formed of individual cylindrical tubes 31. The tubes may be formed as by extrusion, and sealed at the ends in flat leaf-like ends 32 and 33 which have a dove-tail appearance upon sealing. Then the tubes 31 preferably are abutted in side-by-side parallel relation and the overlapping portions of the ends 32 and the ends 33 are heat sealed together to form a unitary structure. The resulting structure 30 may then be mounted in the collector as shown in FIG. 2.

FIG. 6 exemplifies another embodiment of the invention in a collector 10 where a convection inhibiting member 40 is formed of a continuous length of tubing 41 which is alternately wrapped or turned about pins 42 and 43 in a serpentine pattern to form parallel lengths 44-53. Pins 42 and 43 are threadably held by the troughs 20 on side walls 12 and 12a and extend upwardly or downwardly therefrom. The pins 42 and 43 are preferably so spaced that the sides of the adjacent lengths 44-53 are in contact. The sealed flat ends are bonded or otherwise secured to the underside of troughs 20.

FIG. 7 shows a modification of the embodiment shown in FIG. 6 wherein a resilient member 54 is provided compressibly disposed between wall 12 and pin 43. Tubular member 40 is pinched between pin 43 and resilient member 54. This divides tubular member 40 into airtight segments which can prevent the deflation of the entire tubular member 40 should a leak develop in one segment. Similar resilient members 54 may likewise be disposed between the remaining pins 42 or 43 and the proximate walls 12 and 12a, further dividing tubular member 40. Pins 42 and 43 are preferably cylindrical so as to not present any sharp edges which can puncture member 40.

FIG. 8 shows a side-view detail of a modification of the embodiment shown in FIG. 7. Pin 55 is provided with a notch 56 formed circumferentially in the cylindrical side intermediate the ends of the pin. The notch permits air flow between segments of the tubular member 40 to permit inflation thereof from one end, if it becomes necessary. The notch further permits tubular member 40 to be installed in a collector deflated, and later inflated when the collector is to be used.

FIG. 9 shows a modification of the embodiment shown in FIG. 8. A resilient member 57 is provided having a bulge 58 projecting from one wall 59 thereof. Bulge 58 is formed so as to project into notch 56 in pin 55 to create an airtight seal between adjacent sections of tubular member 40.

FIG. 10 exemplifies an arrangement where two convection current inhibiting members 24 are stacked in nested overlapping relationship. The stacked members 24 may be provided in place of the single member 24 in the collector shown in FIG. 2.

In all of the embodiments shown there is no unrestricted air path about the convection current inhibiting members 24 and 30.

The disclosed arrangements offer decided advantages over the use of two or more sashes of cover member 13. There is a substantial savings in weight and also a savings in money. A clear polytetrafluoroethylene sheet approximately 0.001" thick has a light transmittance of 92%, while high transmittance glass (without any iron content) has a transmittance of about 88%.

In the embodiments of FIGS. 5 and 6 it is preferred that the tubes be in contact along their lengths. However, a slight spacing therebetween may be permitted so long as it is not great enough to permit convection cells to occur between the tubes.

The convection inhibiting members disclosed may be used with any type of collector housing having an air space between a transparent cover and an absorber panel. The described housing is merely for purposes of illustration and not by way of limitation.

It may thus be seen that the objects of the invention set forth as well as those made apparent from the foregoing description are efficiently attained. While preferred embodiments of the invention have been set forth for purposes of disclosure, modifications to the disclosed embodiments of the invention as well as other embodiments thereof may occur to those skilled in the art. Accordingly, the appended claims are intended to cover all embodiments which do not depart from the spirit and scope of the invention.

What is claimed is:

1. In a solar energy collector having a transparent cover member, means defining a housing including end and side walls, and a solar energy absorber therein beneath a transparent cover member, said housing adapted to be operatively positioned with one end wall higher than the other, the improvement comprising means for inhibiting convection currents between the absorber and cover member, said means comprising a plurality of pins attached to said housing, an elongated tubular gas-containing member of transparent material of good light transmissivity, said tubular member being wrapped in a serpentine manner over the absorber around said pins, with adjacent horizontally extending turns in essentially parallel contact, and at least one member juxtaposed one of said pins compressing said tubular member against the proximate pin to divide said tubular member into segments.

2. The collector of claim 1 further including a plurality of compressing members, each juxtaposed one of said pins.

3. The collector of claim 2 wherein said compressing members are resilient.

4. The collector of claim 1 wherein said pins are generally cylindrical, each pin having a notch formed in the cylindrical side thereof to permit air flow between adjacent segments of said tubular member.

5. The collector of claim 4 wherein at least one of said compressing members is provided with a bulge projecting into the notch in its proximate pin.

6. In a solar energy collector having a transparent cover member, means defining a housing including end and side walls, a solar energy absorber in said housing beneath the transparent cover member, said housing adapted to be operatively positioned with one end wall higher than the other, the improvement comprising a plurality of adjacent tubular horizontally extending members of transparent material of good light transmissivity positioned between the absorber and the cover member having heat sealed ends, each end including a dove-tail portion that overlaps the dove-tailed portions of adjacent members and is engaged to said housing to thereby inhibit convection currents between said absorber and said cover member.

* * * * *